US006264236B1

(12) United States Patent
Aoki

(10) Patent No.: US 6,264,236 B1
(45) Date of Patent: Jul. 24, 2001

(54) OCCUPANT RESTRAINT SYSTEM

(75) Inventor: Hiroshi Aoki, Echi-gun (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 09/420,759

(22) Filed: Oct. 20, 1999

(30) Foreign Application Priority Data

Oct. 20, 1998 (JP) .................................................. 10-297842

(51) Int. Cl.$^7$ ............................ B60R 21/00; B60R 21/32
(52) U.S. Cl. ........................................... 280/735; 180/268
(58) Field of Search ............................ 280/735; 180/268

(56) References Cited

U.S. PATENT DOCUMENTS

| 5,174,600 | 12/1992 | Jahn et al. | 280/733 |
| 5,785,347 | * 7/1998 | Adolph et al. | 280/735 |
| 5,868,423 | * 2/1999 | Takimoto et al. | 280/735 |
| 5,906,393 | * 5/1999 | Mazur et al. | 280/735 |

FOREIGN PATENT DOCUMENTS 2 761 032   3/1997  (FR) .

* cited by examiner

*Primary Examiner*—Kenneth R. Rice
(74) *Attorney, Agent, or Firm*—Foley & Lardner

(57) ABSTRACT

An occupant restraint system which, when an occupant on a vehicle seat is a child, can change the operational mode of an airbag device to a suitable mode. When the signal from an occupant estimating unit is not ON, an inflator is not actuated even when the output signal of an emergency detecting device is ON. A weight estimating portion determines whether the value of the load applied to the seat detected by weight sensors exceeds a threshold Y. An occupant condition estimating portion determines that the occupant is a child when the tension switch detects a tension exceeding a predetermined value and then sets the output signal of the occupant estimating unit to be OFF. When the tension switch does not detect a tension exceeding the predetermined value and the weight estimating portion determines that the load detected by the weight sensors does not exceed a threshold, it is determined that the occupant is a child and the output signal of the occupant estimating unit is set to be OFF.

16 Claims, 6 Drawing Sheets

OCCUPANT RESTRAINT SYSTEM

BACKGROUND OF THE INVENTION

1. Field of the Invention

The present invention relates to an occupant restraint system such as an airbag device, to secure safety for an occupant in the event of a vehicle collision. More particularly, the present invention relates to an occupant restraint system wherein the operational mode is variable according to the size of a person sitting on a seat.

2. Description of the Related Art

Vehicles are equipped with occupant restraint systems such as airbag devices for protecting occupants in the event of vehicle collision and, in the United States, it has been considered to require vehicles to be provided with such restraint systems by regulation. As an example, an airbag device includes an inflator and an airbag wherein the inflator actuates to inflate the airbag and the inflated airbag restrains an occupant, thereby preventing the occupant from colliding with a vehicle body or preventing the occupant from being thrown out of the vehicle. The occupant restraint system is directed to secure the safety for an occupant by restraining the body of the occupant in the event of a vehicle collision.

In case where the occupant is an infant or a child, however, the airbag may injure the infant or the child if the airbag is deployed in a normal mode. Therefore, it is required to detect the constitution of the occupant, and to deploy the airbag in a mode different (including a case of not deploying the airbag) from the normal mode when it is detected that the occupant is an infant or a child. However, means for achieving the aforementioned operation have never been realized.

SUMMARY OF THE INVENTION

The present invention is made under the above circumstances and the object of the present invention is to provide an occupant restraint system wherein when the occupant is an infant or a child, the operational mode of an airbag can be changed to a mode suitable for the infant or the child.

A first aspect of the present invention for solving the problems is an occupant restraint system for restraining an occupant in the event of a vehicle collision, comprising an occupant sensor for detecting the constitution of the occupant sitting on a seat, and a tension switch installed on a seat belt which becomes in a first state when a tension exceeding a certain value (first threshold) is exerted on the seat belt and becomes in a second state in cases of other situations, wherein the operational mode of the occupant restraint system is variable according to the conditions of the occupant sensor and the tension switch.

In this aspect, according to the conditions of the occupant sensor for detecting the constitution of the occupant sitting on a seat and a tension switch installed on the seat belt, it is determined whether the person sitting on the seat is an adult or a child. Even when a child seat is fixed to the seat, it can be securely detected that the occupant is a child whereby the operation mode can be changed.

A second aspect of the present invention for solving the problem is the first aspect characterized in that the operational mode is set to a mode different from the normal mode when the tension switch is in the first state, and the operational mode is set to a mode different from the normal mode according to the output of the occupant sensor when the tension switch is in the second state.

In this aspect, when the load on the tension switch exceeds the first threshold, it is determined that a child seat is on the seat and is fixed by the seat belt, that is, the occupant is a child, so the operational mode is set to a mode different from the normal mode. When the load on the tension switch does not exceed the first threshold, it is determined that a person is sitting on the seat. Then, it is determined whether the person is an adult or a child by using the output from the occupant sensor. When the person is a child, the operation mode is set to a mode different from the normal mode. Therefore, even when the child seat is fixed to the seat, it can be securely detected that the occupant is a child and the operational mode can be selected to correspond to the situation.

It should be noted that the term "normal mode" means an operational mode when, for example, the occupant is an adult and that the term "mode different from the normal mode" means, for example, an operational mode in which an airbag is deployed with a reduced force of deployment or is deployed in two stages or is not deployed. This is true for the aspects according to the respective claims.

A third aspect for solving the problem is the first aspect or the second aspect characterized in that the first threshold is in a range from 3 kgf to 15 kgf.

When the occupant normally wears the seat belt, there is no possibility that the average tension of the seat belt steadily exceeds 3 kgf in view of the performance of the retractor and also in view of the sufferance of the occupant. Accordingly, the lower limit of the first threshold is 3 kgf. The tension of the seat belt for fixing the child seat is normally about 10 kgf and the tension exceeding 15 kgf brings about significant error of the measurement of the seat weight. Accordingly, the upper limit of the first threshold is 15 kgf.

A fourth aspect for solving the problem is any one of the first through third aspects characterized in that the occupant sensor is a weight sensor which detects the load applied on the seat.

The weight sensor is employed as the occupant sensor, thereby securely detecting whether the occupant is an adult or a child.

A fifth aspect for solving the problem is the fourth aspect characterized in that the operational mode is set to a mode different from the normal mode when the tension switch is in the first state, and the operational mode is set to a mode different from the normal mode when the tension switch is in the second state and the load detected by the weight sensor is not exceeding another certain value (second threshold).

As described with regard to the second aspect, when the load on the tension switch exceeds the first threshold, it is determined that a child seat is on the seat and is fixed by the seat belt so that the occupant is a child and the operational mode is set to a mode different from the normal mode. When the load on the tension switch does not exceed the first threshold, it is determined that a person is sitting on the seat and, in addition, when the load on the weight sensor exceeds the certain value (second threshold), it is determined that the person is an adult on the seat, and the operational mode is set to the normal mode. When the load detected by the weight sensor does not exceed the certain value (second threshold), it is determined that a child is sitting on the seat and the operational mode is set to a mode different from the normal mode. Therefore, even when a bolster seat is mounted on the seat, it can be securely detected that the occupant is a child whereby the operation mode can be selected to correspond to the situation.

A sixth aspect for solving the problem is the fifth aspect characterized in that the second threshold W is determined by an equation $W=\alpha X+Y$ wherein a load conversion factor is assumed as $\alpha$, the first threshold is assumed as X, a load to be exerted on the seat at which the operational mode of the occupant restraint system must be changed when the seat belt is not used is assumed as Y.

The load Y to be exerted on the seat at which the operational mode of the occupant restraint system must be changed means a load allowing judgement whether the occupant is a child or an adult and is primarily the same as the second threshold as stated with reference to the fifth aspect. However, when the occupant wears the seat belt, the tension of the seat belt affects the value detected by the weight sensors. That is, the tension when the occupant wears the seat belt does not exceed X as mentioned above. A value obtained by multiplying the value of the tension by the effect factor $\alpha$ is added to the load to be detected by the weight sensors. Accordingly, the second threshold is preferably a value which is the sum of the value Y which is primarily the second threshold and the maximum load $\alpha X$ to be applied when the occupant wears the seat belt. The value of $\alpha$ depends on the configuration of the seat belt and the fixing method of the seat belt to the seat so that the value $\alpha$ should be determined based on experiences to correspond to the configuration and the fixing method. As for the second threshold, instead of addition of $\alpha X$, a comparison between a value obtained by subtracting $\alpha X$ from the load detected by the weight sensor and Y may be made. It should be understood that such a way is equivalent to this aspect.

According to this aspect, since the second threshold is determined taking the effect of the seat belt tension into consideration, a discrimination between child and adult can be accurately performed.

A seventh aspect for solving the problem is any one of the second through sixth aspects characterized in that, instead of that the operational mode is set to a mode different from the normal mode when the tension switch is in the first state, when the tension switch is in the first state, the operational mode is changed to a mode different from the normal mode according to the output of the occupant sensor under a condition different from the condition when the tension switch is in the second state.

In any one of the second through sixth aspects, when the tension switch is in the first state, the operational mode is set to a mode different from the normal mode. In this aspect, however, also in this case, the operational mode is set to a mode different from the normal mode according to the output of the occupant sensor. The condition for that are different from the condition of the case where the tension switch is in the second state. According to this aspect, even when the tension switch is in the first state, the output of the occupant sensor is taken for judgement, thereby improving the accuracy of the judgement.

An eighth aspect of the present invention for solving the problem is the seventh aspect characterized in that the condition for changing the operational mode to the mode different from the normal mode is that the load detected by the weight sensor is not exceeding the sum of Y and a predetermined value Z wherein Y is a load to be exerted on the seat at which the operational mode of the occupant restraint system must be changed when the seat belt is not used.

In this aspect, when the tension sensor is in the first state, the operational mode is set to a mode different from the normal mode only when the load detected by the weight sensor as the occupant sensor does not exceed (Y+Z). This Y is the same as the Y as stated with reference to the sixth aspect. Therefore, it can be accurately detected that nobody sits on the seat. Instead of the detection that the load detected by the weight sensor does not exceed (Y+Z), a value may be obtained by subtracting Z from the load detected by the weight sensor and it may be detected that the value does not exceed Y. It should be understood that such a way is equivalent to this aspect.

A ninth aspect of the present invention for solving the problem is any one of the second through eighth aspects, characterized by comprising, instead of the tension switch installed on the seat belt which becomes in a first state when a tension exceeding a certain value (first threshold) is exerted on the seat belt and becomes in a second state in cases of other situations, a tension switch installed on the seat belt which becomes in a first state when a tension exceeding a certain value (first threshold) is exerted on the seat belt continuously for a predetermined period of time and becomes in a second state in cases of other situations.

There are cases that the tension switch is temporarily in the first state due to the action of the occupant during braking behavior. In this state, though an adult occupant sits on the seat, an erroneous judgement that the child seat is on the seat may be made. In this aspect, the tension switch is employed which becomes in the first state when a tension exceeding a certain value (first threshold) is exerted on the seat belt continuously for a predetermined period of time and becomes in the second state in cases of other situations. Since the condition never be continued for a long time, the employment of such a tension switch prevents the malfunction.

"A tension switch installed on the seat belt which becomes in a first state when a tension exceeding a certain value (first threshold) is exerted on the seat belt continuously for a predetermined period of time and becomes in a second state in cases of other situations" includes not only a switch having such a function, but also a switch which cooperates with a control circuit (including a software) to have such a function. For example, an on-delay timer is connected to the switch and its output is assumed as the output of the tension switch. Alternatively, a low pass filter is connected to the output of the switch and its output is assumed as the output of the tension switch. Also alternatively, a micro computer monitors the output of the switch and it is determined that the output of the tension switch is in the first state only when the first state is continued for a predetermined period of time.

A tenth aspect for solving the problem is any one of the second through eighth aspects characterized by comprising, instead of the tension switch installed on the seat belt which becomes in a first state when a tension exceeding a certain value (first threshold) is exerted on the seat belt and becomes in a second state in cases of other situations, a tension switch installed on the seat belt which becomes in a first state when no tension or a tension not exceeding a certain value (first threshold) is exerted on the seat belt continuously for a predetermined period of time and becomes in a first state in cases of other situations.

In this aspect, on the contrary to the ninth aspect, the output of the tension switch is in the second state when chattering occurs. Therefore, the determination whether the occupant is a child or an adult is made according to the output of the occupant sensor, thereby providing somewhat reliable determination.

"A tension switch installed on the seat belt which becomes in a second state when no tension or a tension not exceeding a certain value (first threshold) is exerted on the seat belt continuously for a predetermined period of time and becomes in a first state in cases of other situations" includes not only a switch having such a function, but also a switch which cooperates with a control circuit (including a software) to have such a function. For example, an off-delay timer is connected to the switch is connected and its output is assumed as the output of the tension switch. Alternatively, a low pass filter is connected to the output of the switch and its output is assumed as the output of the tension switch. Also alternatively, a micro computer monitors the output of the switch and it is determined that the output of the tension switch is in the second state only when the second state is continued for a predetermined period of time.

An eleventh aspect for solving the problem is any one of the second through tenth aspects, characterized in that when a buckle switch detects that a tongue plate is not latched, the operational mode is determined assuming that the tension switch is in the second state.

In this aspect, when the buckle switch detects that the tongue plate is not latched, it can be considered that the seat belt is not used so that the determination whether the occupant is a child or an adult is made only by the occupant sensor, thereby providing somewhat reliable determination.

A twelfth aspect for solving the problem is any one of the sixth through tenth aspects, characterized by further comprising a function for setting said $\alpha X=0$ assuming that the tension switch is in the second state when a buckle switch detects that the tongue plate is not latched.

The tension of the seat belt may be 0 when the tongue plate is not latched. Therefore, according to this aspect, the tension switch is assumed as being in the second state in this case so that $\alpha X$ in the equation of the sixth aspect is forcedly set to 0 and the determination is made only by the value from the weight sensor. Therefore, even when the tongue plate is not latched, accurate determination can be made.

A thirteenth aspect for solving the problem is the eleventh aspect or the twelfth aspect, characterized by further comprising an alarm portion which gives an alarm when the buckle switch detects that the tongue plate is not latched and the tension switch is in the first state.

When the buckle switch detects that the tongue plate is not latched, the tension switch must be in the second state. Therefore, according to this aspect, when the buckle switch detects that the tongue plate is not latched and the tension switch is in the first state, an alarm is given, thereby informing the occupant an abnormality of the tension switch.

A fourteenth aspect for solving the problem is any one of the second through thirteenth aspects, further comprising a short-circuit/breakage detecting device for detecting a short circuit and/or breakage of wiring to the tension switch, wherein the operational mode is determined assuming that the tension switch is in the second state when the short-circuit/breakage detecting device detects a short circuit and/or breakage of the wiring.

In this aspect, the operational mode is determined assuming that the tension switch is in the second state when the short-circuit/breakage detecting device detects a short circuit and/or breakage of the wiring. Therefore, the determination whether the occupant is a child or an adult is made by the occupant sensor, thereby providing somewhat reliable determination. It should be understood that the short-circuit/breakage detecting device may detect at least one of the short circuit and the breakage and is not required to detect them both.

A fifteenth aspect of the present invention for solving the problem is the fourteenth aspect, characterized by further comprising an alarm portion which gives an alarm when the short-circuit/breakage detecting device detects the short circuit and/or breakage of the wiring.

According to this aspect, the abnormality of the tension switch can be informed to the occupant.

A sixteenth aspect for solving the problem is any one of the first through fifteenth aspects, characterized in that the tension switch is operated according to the load having a correlation with the belt tension exerted on the mechanical portion of a buckle or a retractor on which a force from the seat belt is exerted.

According to this aspect, a certain load having a relation of the tension on the seat belt is detected and the state of the switch is determined based on the load, thereby improving the accuracy of the operation and facilitating the change of the exchanging point of the switch.

DETAILED DESCRIPTION OF THE PREFERRED EMBODIMENTS

Hereinafter, embodiments of the present invention will be described with reference to the drawings. FIGS. 1(A) through 1(D) are views each illustrating a state where a person is on a front passenger seat. In FIGS. 1(A) through 1(D), numeral 1 designates a seat, 2a designates a lap belt, 2b designates a shoulder belt, 3 designates a tension switch, 4 designates an infant seat, 5 designates an infant, 6 designates a child seat, 7 designates a small child, 8 designates a bolster seat, 9 designates a child, and 10 designates an adult.

Figure 1A:
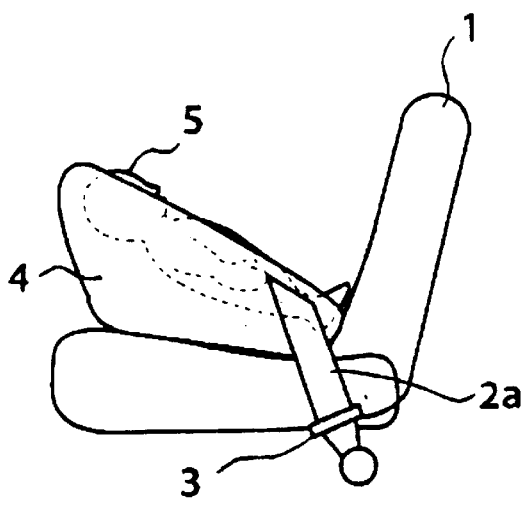
FIGS. 1(A) through 1(D) are views illustrating four states, respectively, in which a person is on a front passenger seat.
Figure 1B:
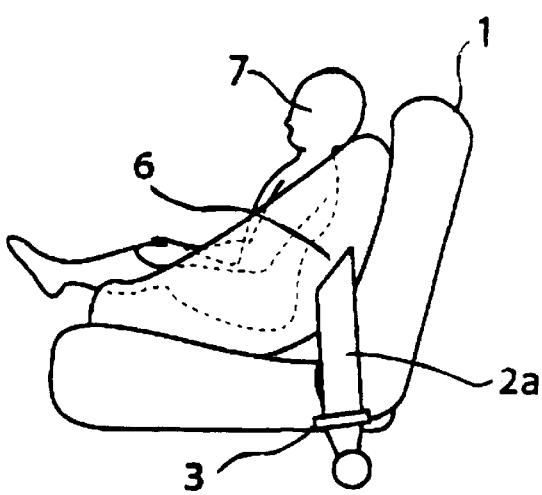
Figure 1C:
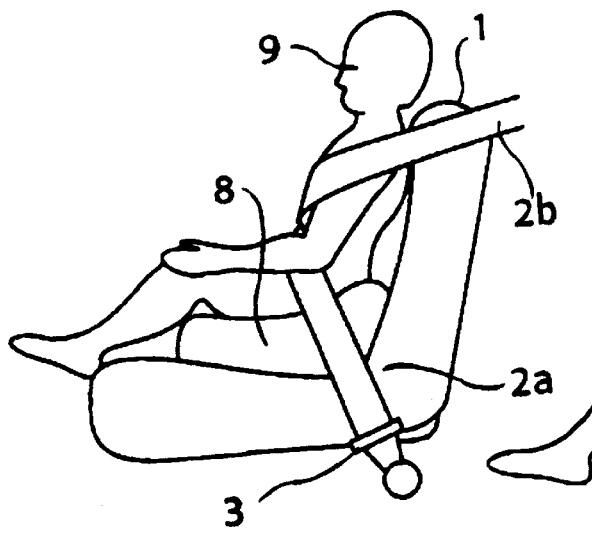
Figure 1D:
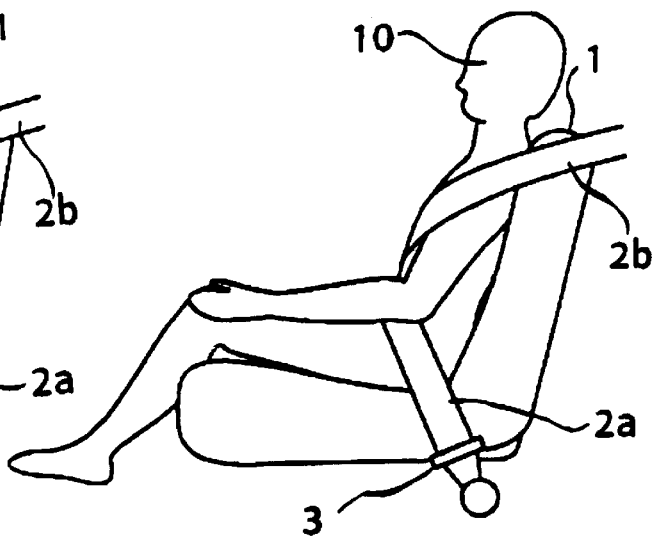

FIG. 1(A) shows a state where the infant seat (RIFS: Rearward Infant Seat) 4 is fixed to the seat 1 by the lap belt 2a and the infant 5 (about 12-month old) is put on the infant seat. In this case, the net load applied on the seat 1 is about 15 kgf and the tension applied on the lap belt is about 10 kgf. FIG. 1(B) shows a state where the child seat 6 is fixed to the seat 1 by the lap belt 2a and the small child 7 (about three years old) sits on the child seat. In this case, the net load applied on the seat 1 is about 23 kgf and the tension applied on the lap belt is about 10 kgf. FIG. 1(C) shows a state where the bolster seat 8 is put on the seat 1, the child (about six years old) sits on the bolster seat, and the lap belt 2a and the shoulder belt 2b are fastened to extend over the child. In this case, the net load applied on the seat is about 25 kgf and the tension applied on the lap belt 2a is about 2 kgf. FIG. 1(D) shows a state where the adult 10 having a small build sits on the seat 1. In this case, the net load applied on the seat is about 40 kgf and the tension applied on the lap belt 2a is about 2 kgf.

As shown in FIGS. 1(A) through 1(D), when the lap belt 2a is fixed to a floor and the infant seat 4 or the child seat 6 is fixed by the lap belt 2a or somebody wears the seat belt, a part of the tension applied on the lap belt 2a is added as a load to the net load. The load applied through the lap belt 2a is about 7 kgf in the cases of (A), (B), about 2 kgf in the case of (C), or about 0–2 kgf in the case of (D). Accordingly, the total load applied on the seat 1 is about 22 kgf in case of (A), about 30 kgf in case of (B), about 27 kgf in case of (C), and about 40–42 kgf in case of (D).

By determining whether the seat load exceeds a threshold which is set at a value from a range between 30 kgf and 35 kgf, it can be judged whether the occupant on the seat 1 is an adult or a child, so far as it goes. However, the tension applied for fixing the infant seat 4 or the child seat 6 is variable according to the configuration of the seat and/or the force applied by a person who sits in the infant seat 4 or the child seat 6, so there is a case that the tension exceeds 10 kgf. Therefore, there is a case that the total load applied on the seat exceeds 30 kgf when the child seat 6 is set on the seat 1. In addition, the tension is variable according to the pitching of a vehicle when driving. The judgment whether the occupant on the seat is an adult or a child by means of the load on the seat 1 only can provide somewhat reliability, but not complete reliability. According to the present invention, the lap belt 2a (or the shoulder belt 2b on the situation) is provided with the tension switch 3 and the determination whether the occupant is an adult or a child is made according to the load on the seat and the state of the tension switch.

Figure 2A:
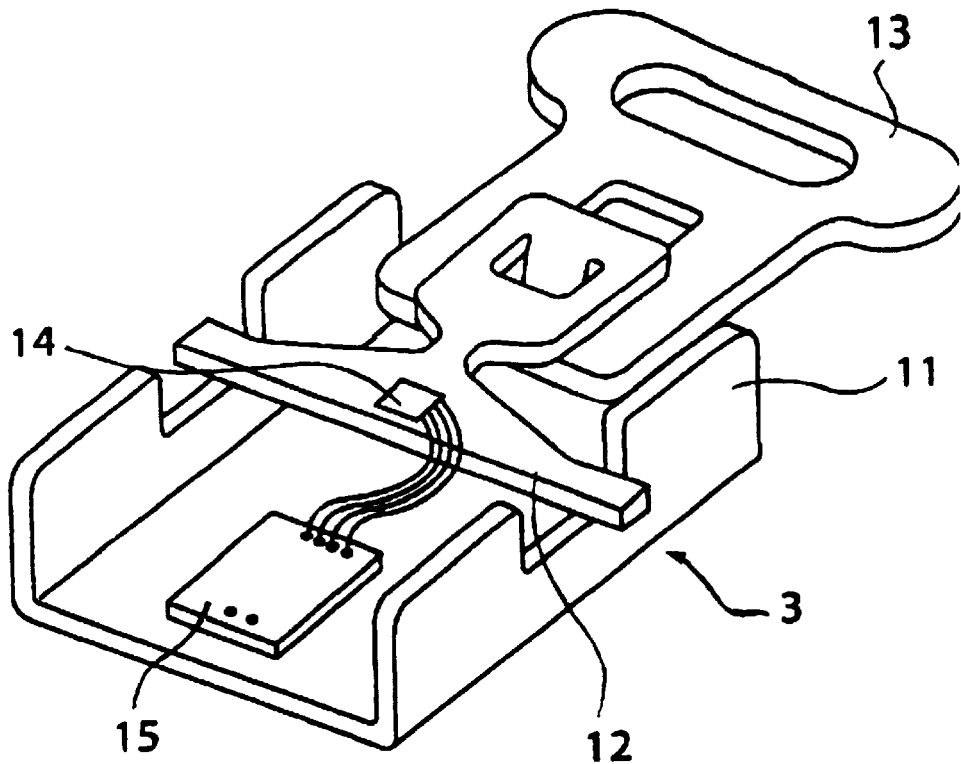
FIGS. 2(A), 2(B) show schemata of the mechanical construction and the electric circuit construction of an example of the tension switch.
Figure 2B:
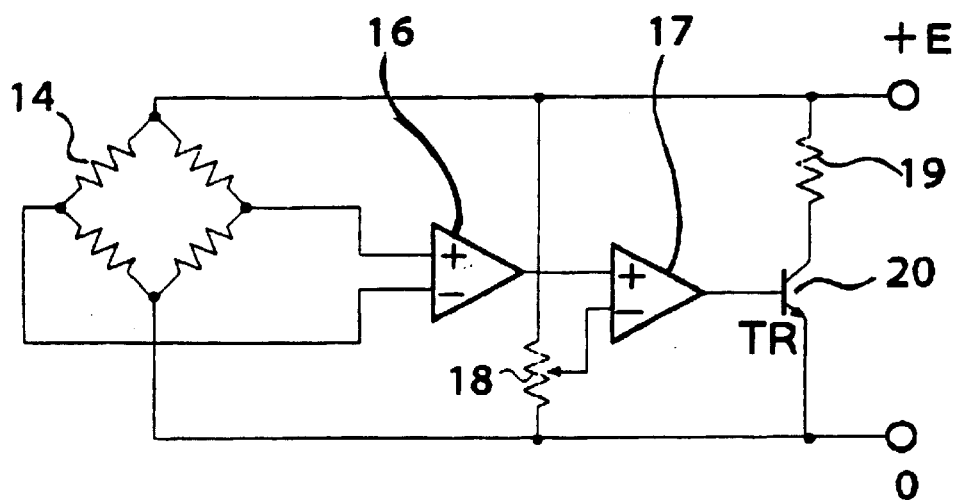

FIGS. 2(A), 2(B) show schemata of the mechanical construction and the electric circuit construction of an example of the tension switch 3. In FIGS. 2(A), 2(B), numeral 11 designates a buckle body, 12 designates a latch, 13 designates a tongue plate, 14 designates a strain gauge, 15 designates a circuit substrate, 16 designates a differential amplifier, 17 designates a comparator, 18 designates a variable resistor, 19 designates a resistor, and 20 designates an output transistor.

FIG. 2(A) shows the mechanical construction of the tension switch 3. The buckle body 11 is secured to an end of a stalk fixed to the vehicle floor or the seat. The tongue plate 13 with the seat belt passing through an opening thereof is inserted into a space between the buckle body 11 and the latch 12 against the force of a spring (not shown) biasing the latch. Then, the latch 12 and an engaging portion of the tongue plate 13 are engaged with each other so as to be fixed to each other. As a tension is applied to the seat belt, the latch 12 is pressed to cutout portions formed in the buckle body and is thus elastically deformed. Attached to the latch 12 is the strain gauge 14 which outputs a voltage corresponding to the amount of the elastic deformation. The output of the strain gauge 14 is amplified by the circuit in the circuit substrate 15 provided in the buckle body 11, whereby the tension applied to the seat belt is detected. As a result of that the detected value is compared to a reference value so that ON/OFF output can be obtained according to the level of the tension.

FIG. 2(B) is a diagram showing a schema of the electric circuit of the tension switch. Applied to the resistance bridge of the strain gauge 14 is a constant voltage+E. As the resistances of resistors composing the respective arms vary due to applied strain, the resistance bridge is unbalanced so that output voltage is generated from the strain gauge 14. The voltage is amplified by the differential amplifier 16 and compared by the comparator 17 to the reference voltage given from the variable resistor 18. As the output voltage of the strain gauge 14 exceeds the reference voltage, the output of the comparator 17 is positive so that the output transistor 20 is turned ON. Therefore, current flows into the circuit through the resistor 19 so as to increase the current in the circuit. When the output voltage of the strain gauge 14 is smaller than the reference voltage, the output of the comparator 17 is negative so that the output transistor 20 is turn OFF. Therefore, no current flows into the circuit through the resistor 19 so as to decrease the current in the circuit. Therefore, the amount of the current flowing in the tension switch indicates whether the tension applied on the seat belt exceeds the predetermined value. The predetermined value can be set freely by the variable resistor 18.

To simplify the construction of the hardware, the circuit may be located separately so that only the strain gauge 14 is provided, and/or the operation of the comparator and the like may be transacted by software. Though this construction has a disadvantage of requiring four wirings for the strain gauge 14, it has an advantage of eliminating the need to dispose the circuit substrate 15 to the buckle body 11.

Figure 3:
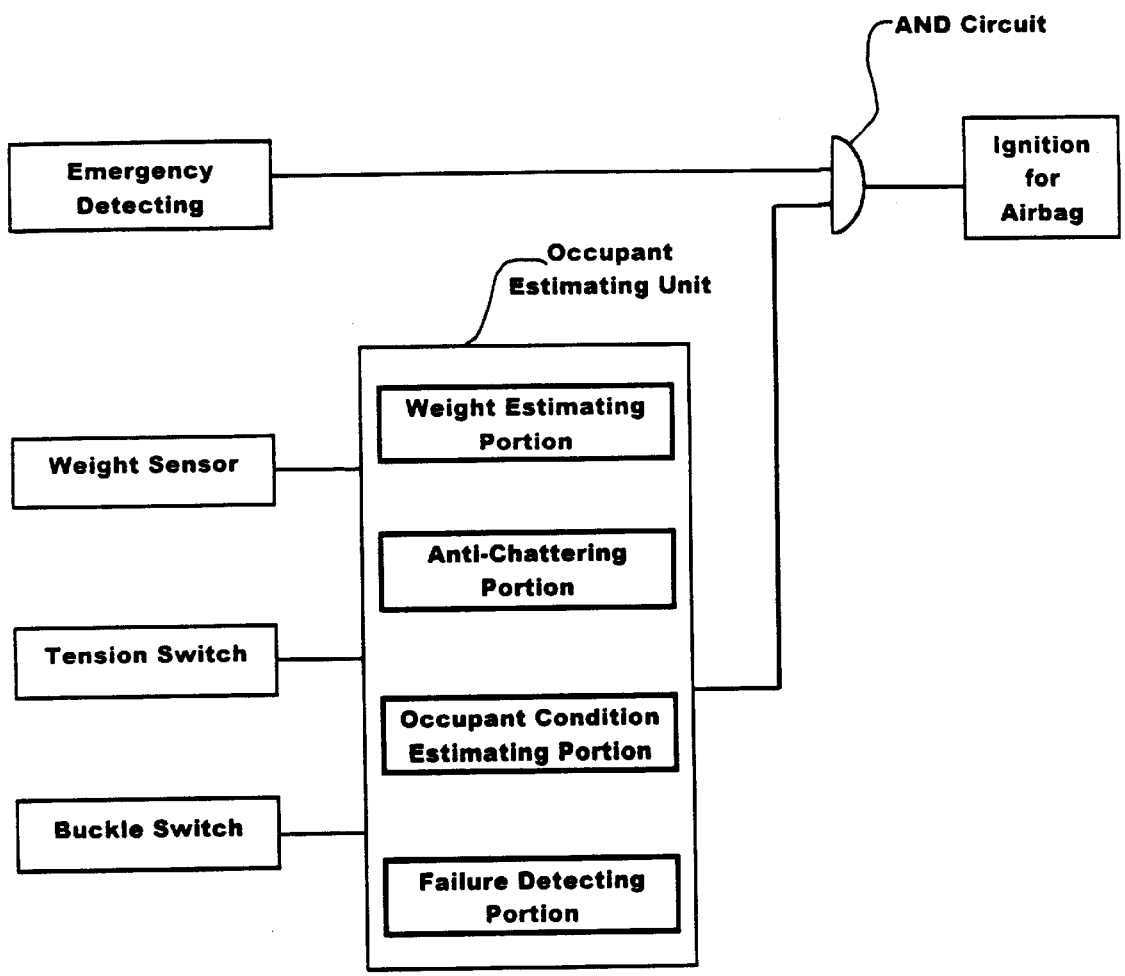
FIG. 3 is a block diagram of an occupant restraint system as an example of the embodiment of the present invention.

FIG. 3 is a block diagram of an occupant restraint system as an example of an embodiment according to the present invention. An emergency detecting device is for detecting the emergency situation such as a vehicle collision and is well known in the art of the air bag system. An occupant estimating unit is the nucleus of the present invention and is actually composed of a micro computer. The micro computer may be a single use or may be common to other micro computer for other control functions.

The occupant estimating unit includes a weight estimating portion, an anti-chattering portion, an occupant condition estimating portion, and/or a failure detecting portion. Signals are inputted into the occupant estimating unit from weight sensors, the tension switch, and the buckle switch and are processed by the weight estimating portion, the anti-chattering portion, the occupant condition estimating portion, and the failure detecting portion of the occupant estimating unit. Actually, the processes are transacted by software. The output of an emergency detecting device and the output of the occupant estimating unit are inputted into an AND circuit. When both the outputs are ON (high level) signals, an inflator of the airbag is actuated for ignition. That is, when an ON signal is not outputted from the occupant estimating unit, the inflator is not actuated even when the emergency detecting device outputs an ON signal. Though, when the occupant estimating unit does not output an ON signal, the inflator is controlled not to actuate in this example, when the occupant estimating unit does not output an ON signal, the inflator may be controlled in such a manner that decreased deployment force for the airbag is developed or that the airbag is developed at two stages.

The weight estimating portion determines whether the value from the weight sensor indicating the load applied on the seat exceeds a predetermined threshold Y. This determination by using the load applied on the seat indicates whether the occupant on the seat is an adult or a child and the aforementioned threshold Y is set in a range from 30 kgf to 35 kgf. The threshold Y is set to a suitable value according to the condition of installation of the seat and the seat belt.

The load applied on the seat is affected by the load of the occupant and the child seat or the like and, in addition, the tension of the seat belt. It is preferable that the threshold Y is set taking the effects into consideration. That is, assuming that the maximum value of the tension of the seat belt within a considerable range of the normal condition is X and that a times the tension is converted to a seat load (α is referred to as "load conversion factor"), the threshold for determining whether the occupant is an adult or a child is set to a value W, not the value Y, calculated from an equation W=αX+Y. This prevents the malfunction of the weight estimating portion due to the seat load converted from the tension of the seat belt. When the tension exceeding Y is applied, there is a possibility of the malfunction of the weight estimating unit. In the present invention, however, as will be described later, the malfunction of the weight estimating unit in this case is not a problem because it is determined that the occupant is a child only from the state of the tension switch.

Figure 4A:
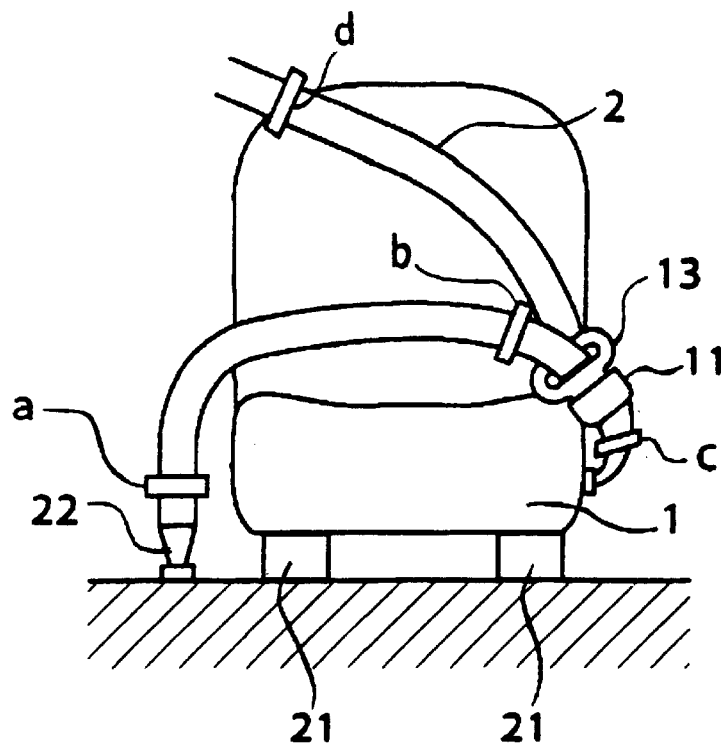
FIGS. 4(A), 4(B) show the relation between the seat and the seat belt.
Figure 4B:
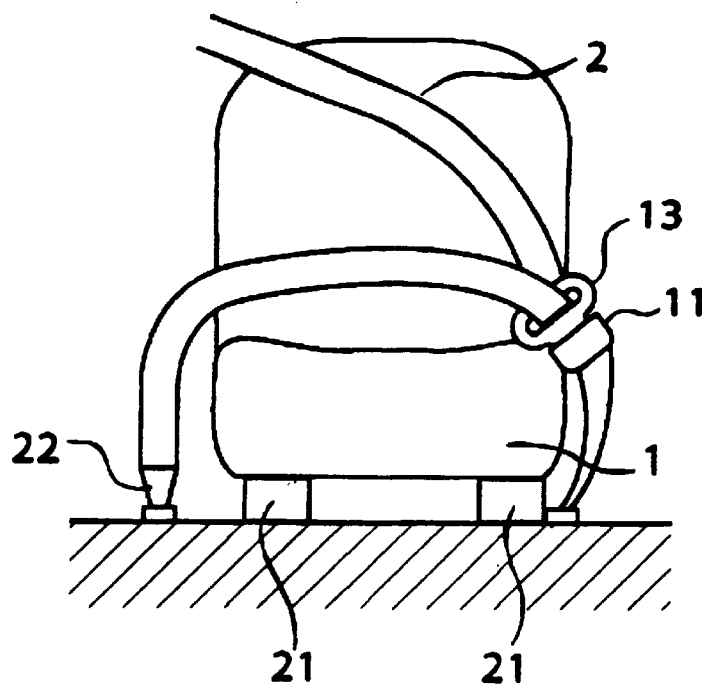

The load conversion factor a is variable according to the configurations of the seat and the seat belt. FIGS. 4(A) and 4(B) show the mutual relation between the seat and the seat belt. In FIGS. 4(A) and 4(B), numeral 2 designates a seat belt, 21 designates a weight sensor, 22 designates a lap outer, and "a"–"d" are possible positions for the installation of a tension switch. In this example, the seat belt 2 has an integral structure of a lap belt and a shoulder belt. FIG. 4(A) shows a case where an end of the seat belt 2 is fixed to a vehicle floor through the lap outer 22 and a middle portion of the seat belt 2 is fixed to the seat 1 through the buckle body 11 and the tongue plate 13. FIG. 4(B) shows a case where an end of the seat belt 2 is fixed to a vehicle floor through the lap outer 22 and a middle portion of the seat belt 2 is fixed to the vehicle floor through the buckle body 11 and the tongue plate 13. In either case, the four corners of the seat 1 are fixed to the vehicle floor via the weight sensors 21. The seat load is calculated by subtracting the self weight of the seat (dead weight) from the sum of the outputs of the four weight sensors 21.

In the case of FIG. 4(A), half the downward load converted from the tension on the seat belt is received by the seat 1. This means that the half of the load is detected by the weight sensors 21 so that the load conversion factor a is set to a value in a range from 0.2 to 0.9. In the case of FIG. 4(B), all of the downward load converted from the tension on the seat belt is detected by the weight sensors 21 so that the load conversion factor a is set to a value in α range from 0.4 to 1.8 (in this case, the range of the second threshold W is in a range from 30 kgf to 38 kgf). Though the range of the load conversion factor α is wide, the factor is substantially fixed if the configurations of the seat and the seat belt and the relational positions between the seat and the seat belt are defined so that the suitable load conversion factor α can be selected from the range.

In FIG. 4(A), the possible locations for the installation of the tension switch are shown. The tension switch can be installed at any of the locations "a" through "d".

The occupant condition estimating portion in FIG. 3 determines finally whether the occupant is an adult or child synthetically from the result of the weight estimating unit and the ON/OFF state of the tension switch. For the determination, the ON/OFF state of the tension switch takes precedence. That is, when the tension switch indicates that the tension exceeds the predetermined value (ON state), only by this information, it is determined that the occupant is a child and the output signal of the occupant estimating unit is set to be OFF (low level). In case that the tension switch indicates that the tension does not exceeds the predetermined value (OFF state) and the result of the weight estimating unit indicates that the load detected by the weight sensors does not exceed the threshold (OFF state), it is determined that the occupant is a child and the output signal of the occupant estimating portion is set to be OFF (low level). In case that the tension switch is in OFF state and the load detected by the weight sensors exceeds the threshold (ON state), it is determined that the occupant is an adult and the output signal of the occupant estimating unit is set to be ON (high level).

The above-mentioned operation is the basic operation of the occupant condition estimating portion. By additionally taking the signal from the buckle switch into consideration, erroneous judgement can be prevented even when the tension switch malfunctions. That is, when the buckle switch is in the OFF state (i.e., the buckle switch outputs the signal indicating the buckle is not latched), it is determined that no occupant is on the seat and the output signal of the occupant estimating unit is set to be OFF. This prevents the erroneous judgement by the occupant estimating unit when the tension switch malfunctions.

Instead of such a determination, the determination may be made only by using signals from the weight sensors eliminating the use of the state of the tension switch for the determination. In this case, when the threshold for the determination by the load is corrected by an effect factor, the aforementioned value of αX may be set to 0.

The occupant estimating unit is provided with the anti-chattering portion so as to prevent the erroneous judgement of the occupant estimating unit due to chattering of the tension switch. There are cases that a tension exceeding the threshold is exerted temporarily to the tension switch due to the action of the occupant during braking behavior. In this state, though an adult occupant sits on the seat, the tension switch may be turned ON and an erroneous judgement that the child seat is on the seat may be made. The anti-chattering portion receives signals from the tension switch and determines that the tension switch is ON only when the ON state is continued for a predetermined period of time. Then, the anti-chattering portion outputs the signal to the occupant condition estimating portion. That is, the anti-chattering portion performs the same action as a case of a combination with an on-delay timer. The occupant condition estimating portion makes a decision by using the signal from the anti-chattering portion, not directly using the signal from the tension switch. This prevents the erroneous judgement as described above.

On the contrary, it can be set not to turn OFF the tension switch even when the tension is temporarily lower than the threshold. For example, when the child seat is fixed by the seat belt, there is a case that the tension switch is temporarily turned OFF, for example, due to the pitching of the vehicle body when running on a rough road and it may be thus determined that the adult occupant is on the seat. To prevent such an erroneous judgement, it is determined that the tension switch is OFF only when the OFF state is continued for a predetermined period of time. Then, the signal is given to the occupant condition estimating portion. That is, the same action as a case of a combination with an off-delay timer is performed. The occupant condition estimating portion makes a decision by using the signal from the anti-chattering portion, not directly using the signal from the tension switch. This prevents the erroneous judgement as described above.

The occupant estimating unit is provided with the failure detecting portion so as to detect the occurrence of a failure and inform the occupant. For example, when the buckle switch is in the OFF state and the tension switch is in the ON state, the failure detecting portion determines that the tension switch is abnormal and gives an alarm to the occupant. Alternatively, the failure detecting portion monitors the current supplied to the tension switch. When the failure detecting portion detects that the current is 0, it is determined that breakage has occurred and an alarm is given to the occupant. On the contrary, when the failure detecting portion detects that the current flows too much, it is determined that a short circuit has occurred and an alarm is given to the occupant. When such a situation occurs, the output of the occupant estimating unit is set to be OFF or the judgement can be made only by the output of the weight sensors.

Hereinafter, a typical example of the operation of the occupant estimating unit will be described by using a flow chart.

Figure 5:
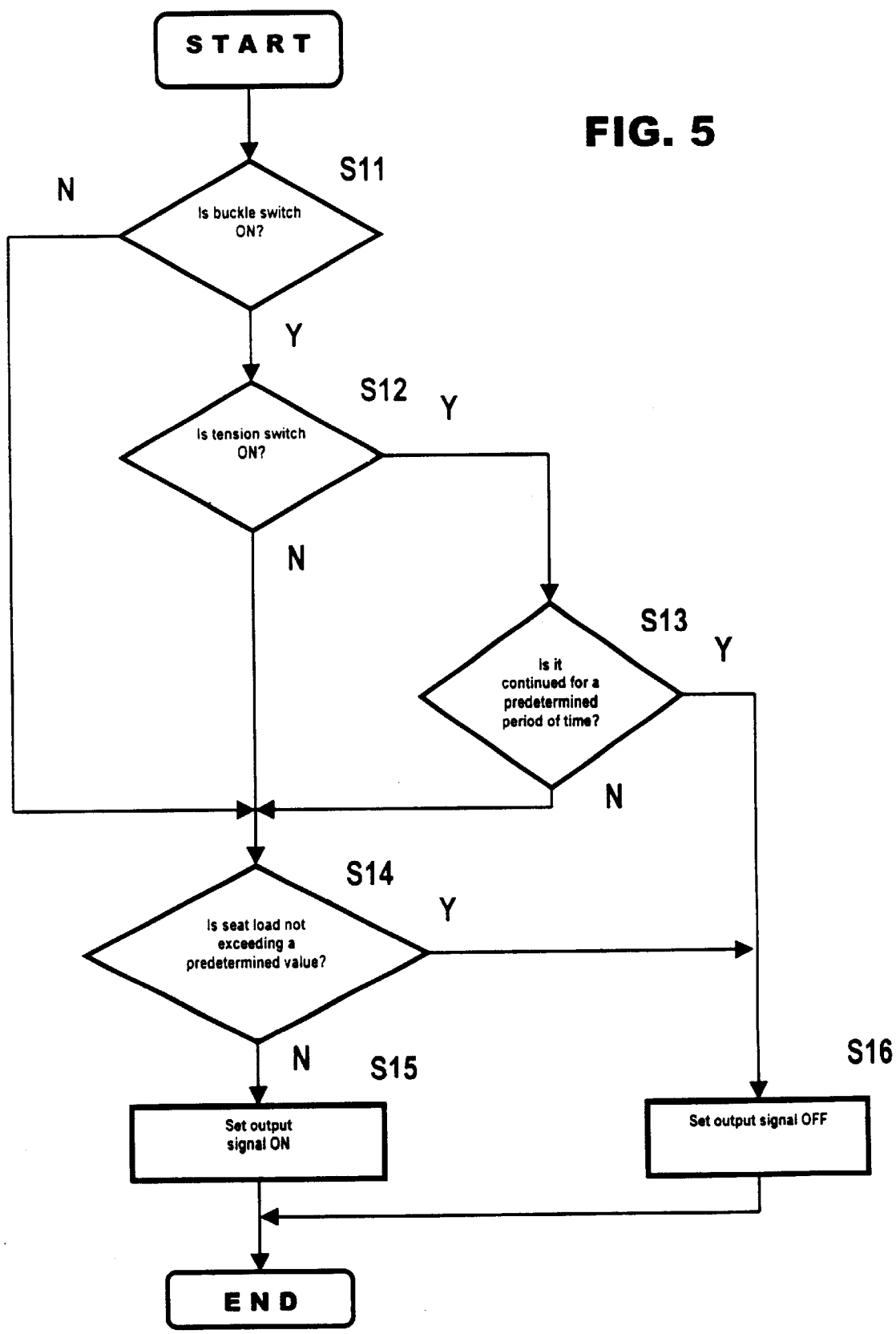
FIG. 5 is a flow chart showing an example of the operation of the occupant estimating unit.

FIG. 5 is a flow chart showing the example of the operation of the occupant estimating unit. The routine is transacted at constant intervals. At a step S11, it is determined whether the buckle switch is ON or OFF. When the buckle switch is OFF (when the tongue plate is not latched), the operation jumps to a step S14 to make a decision by the seat load.

When the buckle switch is ON, the operation proceeds to a step S12 to determine whether the tension switch is ON or OFF. When the tension switch is ON (when the load exceeds the threshold), the operation proceeds to a step S13 where it determines whether the ON state is continued for a predetermined period of time or not. When the ON state is continued for the predetermined period of time, it is determined that this state is not chattering and the operation jumps to a step S16, the output signal is set to be OFF. When the ON state is not continued for the predetermined period of time, it is determined that this state is chattering and the operation proceeds to a step S14.

When it is determined that the state is not chattering at the step S13, the sum of the value of the aforementioned Y (or $\alpha X+Y$) and a predetermined value Z may be compared to the value detected by the weight sensors. When the latter is not exceeding the former, it is determined that nobody is on the seat and the operation may jump to the step S16. When the latter exceeds the former, the operation may proceed to the step S14 (or a step S15).

At the step S14, a determination whether the occupant is an adult or a child is made by using the seat load. That is, it is determined whether the seat load inputted from the weight sensors exceeds the threshold or not. The threshold is set to a suitable load Y between the seat load when a small adult is on the seat and the maximum load when a child seat is fixed to the seat and a child is on the child seat. The threshold is generally set to a value between 30 kgf and 35 kgf (or between 30 kgf and 38 kgf) depending on the configurations of the seat and the seat belt. As stated above, another threshold (second threshold) may be set to a value obtained by adding a value, obtained by multiplying the threshold (first threshold) X of the tension switch by the load conversion factor $\alpha$, to the above load Y, i.e. $\alpha X+Y=W$ (second threshold). When the seat load is not exceeding the threshold, it is determined that the occupant is a child and the operation proceeds to the step S16 where the output signal is set to be OFF. When the seat load exceeds the threshold, it is determined that the occupant is an adult and the operation proceeds to the step S15 where the output signal is set to be ON.

Figure 6:
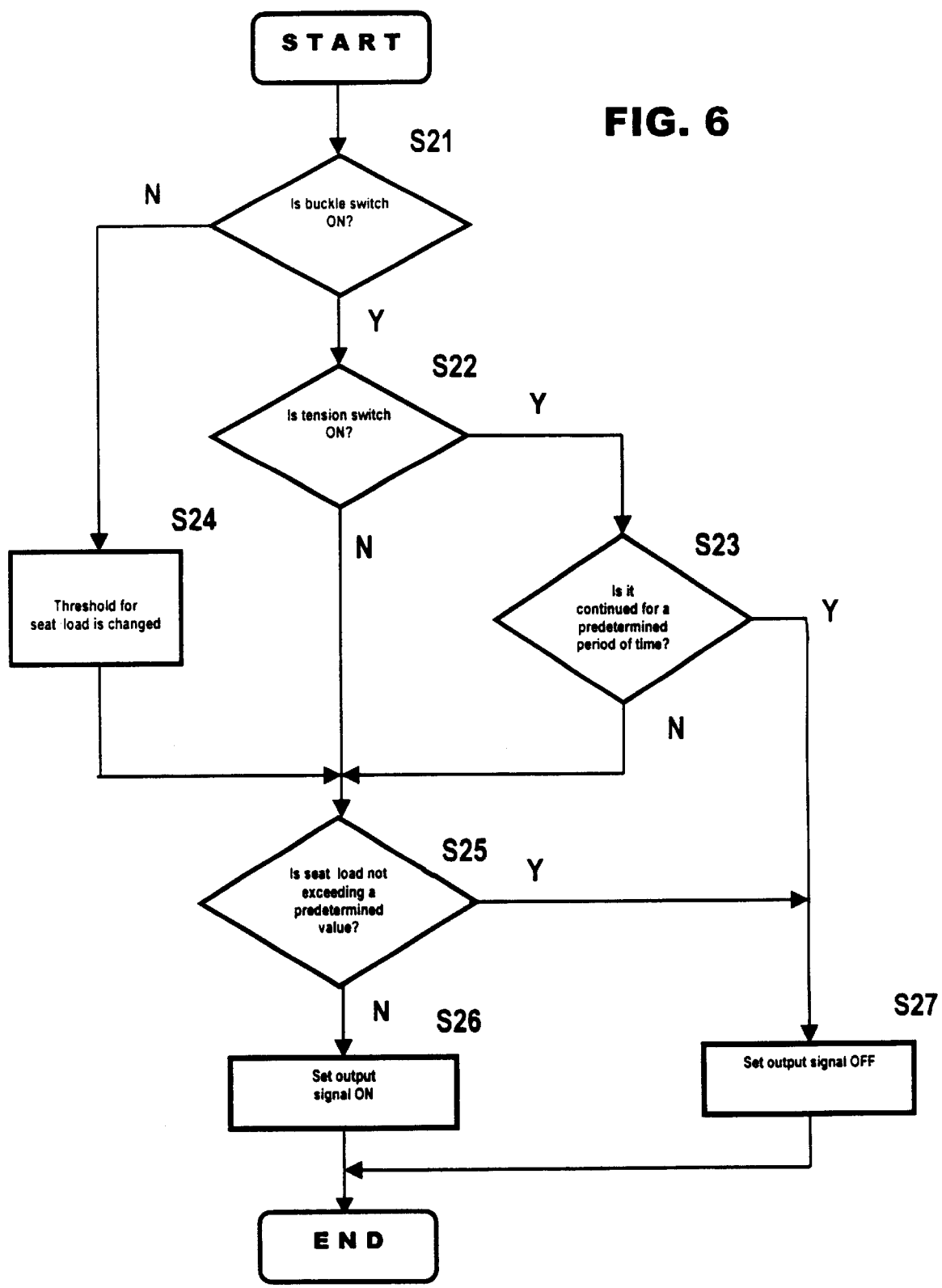
FIG. 6 is a flow chart showing another example of the operation of the occupant estimating unit.

FIG. 6 is a flow chart showing another example of the operation of the occupant estimating unit. The routine is transacted at constant intervals. At a step S21, it is determined whether the buckle switch is ON or OFF. When the buckle switch is OFF (when the tongue plate is not latched), the operation jumps to a step S24 with no reference to the actuation of the tension switch to change the threshold of the seat load. That is, when the threshold is set to $W=\alpha X+Y$, the threshold is changed to $W=Y$ and the operation then proceeds to a step S25. When the threshold does not include such a correction of $\alpha X$, the threshold is not changed and the operation proceeds to the next step.

When the buckle switch is ON, the operation proceeds to a step S22 to determine whether the tension switch is ON or OFF. When the tension switch is ON (when the load exceeds the threshold), the operation proceeds to a step S23 where it determines whether the ON state is continued for a predetermined period of time or not. When the ON state is continued for the predetermined period of time, it is determined that this state is not chattering and the operation jumps to a step S27, the output signal is set to be OFF. When the ON state is not continued for the predetermined period of time, it is determined that this state is chattering and the operation proceeds to a step S25.

At the step S25, a determination whether the occupant is an adult or a child is made by using the seat load. That is, it is determined whether the seat load inputted from the weight sensors exceeds the threshold or not. When the seat load is not exceeding the threshold, it is determined that the occupant is a child and the operation proceeds to the step S27 where the output signal is set to be OFF. When the seat load exceeds the threshold, it is determined that the occupant is an adult and the operation proceeds to the step S26 where the output signal is set to be ON.

As described above, according to an aspect of the present invention, even when a child seat is fixed to the seat, it can be securely detected that the occupant is a child and the operational mode can be selected to correspond to the situation.

According to another aspect of the present invention, the tension of the seat belt at which a seat switch is actuated can be set suitably.

According to a further aspect of the present invention, the weight sensor is employed as the occupant sensor, thereby securely detecting whether the occupant is an adult or a child.

According to another aspect of the present invention, even when a child seat is installed to the seat, it can be securely detected that the occupant is a child whereby the operation mode can be selected to correspond to the situation.

According to a further aspect of the present invention, the effect of the seat belt tension to the weight sensor is taken into consideration, thereby improving the accuracy of the determination.

According to a further aspect of the present invention, even when the tension switch is in the first state, the output of the occupant sensor is taken for judgement, thereby improving the accuracy of the determination.

According to a further aspect of the present invention, when the tension sensor is in the first state, the operational mode is set to a mode different from the normal mode only when the load detected by the weight sensor as the occupant sensor does not exceed (Y+Z), so that it can be accurately detected that nobody sits on the seat.

According to another aspect of the present invention, since the malfunction due to the chattering can be prevented, an accurate determination can be obtained even when the tension switch is chattering.

According to yet another aspect of the present invention, the determination about the occupant can be made by the output of the occupant sensor when the chattering has occurred, thereby providing somewhat reliable determination even in such a case.

According to a further aspect of the invention, when the buckle switch detects that the tongue plate is not latched, it can be considered that the seat belt is not used so that the determination whether the occupant is a child or an adult is made only by the occupant sensor, thereby providing somewhat reliable determination.

According to a still further aspect of the invention, when the buckle switch is OFF, it can be considered that the tension switch is in the second state, and $\alpha X$ in the equation $W=\alpha X+Y$ is forcedly set to 0 and the determination is made only by the value from the weight sensor, thereby providing reliable determination.

According to another aspect of the present invention, the abnormality of the tension switch can be informed to the occupant.

According to yet another aspect of the invention, when the wirings for the tension switch are short circuited or broken, the determination whether the occupant is a child or an adult is made only by the occupant sensor, thereby providing somewhat reliable determination.

According to another aspect of the present invention, the abnormality of the tension switch can be informed to the occupant.

According to yet another aspect of the present invention, a certain load having a relation of the tension on the seat belt is detected and the state of the switch is decided based on the load, thereby improving the accuracy of the operation and facilitating the change of the exchanging point of the switch.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defmed by the claims appended hereto, and their equivalents.

The priority application here, Japanese patent application No. H10-297842, filed Oct. 20, 1998, is hereby incorporated by reference.

I claim:

1. An occupant restraint system for restraining an occupant in the event of a vehicle collision, comprising:
    an occupant sensor for detecting the constitution of the occupant sitting on a seat; and
    a tension switch installed on a seat belt which becomes in a first state when a tension exceeding a first threshold value is exerted on the seat belt and becomes in a second state in cases of other situations,
    wherein an operational mode of the occupant restraint system is variable according to the conditions of the occupant sensor and the tension switch.

2. An occupant restraint system as claimed in claim 1, wherein the operational mode is set to a mode different from a normal mode when the tension switch is in the first state, and the operational mode is set to a mode different from the normal mode according to an output of the occupant sensor when the tension switch is in the second state.

3. An occupant restraint system as claimed in claim 1, wherein the first threshold is in a range from 3 kgf to 15 kgf.

4. An occupant restraint system as claimed in claim 1, wherein the occupant sensor is a weight sensor which detects a load applied on the seat.

5. An occupant restraint system as claimed in claim 4, wherein the operational mode is set to a mode different from a normal mode when the tension switch is in the first state, and the operational mode is set to a mode different from the normal mode when the tension switch is in the second state and the load detected by the weight sensor is not exceeding a second threshold value.

6. An occupant restraint system as claimed in claim 5, wherein the second threshold W is determined by an equation $W=\alpha X+Y$ wherein a load conversion factor is assumed as $\alpha$, the first threshold is assumed as X, a load to be exerted on the seat at which the operational mode of the occupant restraint system must be changed when the seat belt is not used is assumed as Y.

7. An occupant restraint system as claimed in claim 6, further comprising a function for setting said $\alpha X=0$ assuming that the tension switch is in the second state when a buckle switch detects that a tongue plate is not latched.

8. An occupant restraint system as claimed in claim 6, wherein the condition for changing the operational mode to the mode different from the normal mode is that the load detected by the weight sensor is not exceeding the sum of Y and a predetermined value Z wherein Y is a load to be exerted on the seat at which the operational mode of the occupant restraint system must be changed when the seat belt is not used.

9. An occupant restraint system as claimed in claim 1, wherein said tension switch becomes in a first state when the tension exerted on the seat belt exceeds the first threshold value continuously for a predetermined period of time and becomes in a second state in cases of other situations.

10. An occupant restraint system as claimed in claim 1, wherein the operational mode is set to a mode different from a normal mode according to the output of the occupant sensor when the tension switch is in the second state and, when the tension switch is in the first state, the operational mode is changed to a mode different from the normal mode according to the output of the occupant sensor under a condition different from the condition when the tension switch is in the second state.

11. An occupant restraint system as claimed in claim 1, wherein the tension switch is operated according to a load having a correlation with the belt tension exerted on a mechanical portion of a buckle or a retractor on which a force from the seat belt is exerted.

12. An occupant restraint system for restraining an occupant in the event of a vehicle collision, comprising:
    an occupant sensor for detecting the constitution of the occupant sitting on a seat; and
    a tension switch installed on a seat belt which becomes in a first state when a tension exceeding a certain value (first threshold) is exerted on the seat belt and becomes in a second state in cases of other situations,
    wherein an operational mode of the occupant restraint system is variable according to the conditions of the occupant sensor and the tension switch;
    wherein when a buckle switch detects that a tongue plate is not latched, the operational mode is determined assuming that the tension switch is in the second state.

13. An occupant restraint system as claimed in claim 12, further comprising an alarm portion which gives an alarm when the buckle switch detects that the tongue plate is not latched and the tension switch is in the first state.

14. An occupant restraint system for restraining an occupant in the event of a vehicle collision, comprising:
    an occupant sensor for detecting the constitution of the occupant sitting on a seat;

a tension switch installed on a seat belt which becomes in a first state when a tension exceeding a certain value (first threshold) is exerted on the seat belt and becomes in a second state in cases of other situations; and a short-circuit/breakage detecting device for detecting a short circuit and/or breakage of wiring to the tension switch, wherein an operational mode of the occupant restraint system is variable according to the conditions of the occupant sensor and the tension switch;

wherein the operational mode is determined assuming that the tension switch is in the second state when the short-circuit/breakage detecting device detects a short circuit and/or breakage of the wiring.

15. An occupant restraint system as claimed in claim 14, further comprising an alarm portion which gives an alarm when the short-circuit/breakage detecting device detects the short circuit and/or breakage of the wiring.

16. An occupant restraint system for restraining an occupant in the event of a vehicle collision, comprising:

an occupant sensor for detecting the constitution of the occupant sitting on a seat; and a tension switch installed on a seat belt which becomes in a second state when no tension is applied to the seat belt or a tension not exceeding a first threshold value is exerted on the seat belt continuously for a predetermined period of time and becomes in a first state in cases of other situations, wherein an operational mode of the occupant restraint system is variable according to the conditions of the occupant sensor and the tension switch.

* * * * *